W. C. BECKWITH.
EXPANSION BOLT.
APPLICATION FILED MAY 25, 1918. RENEWED OCT. 27, 1919.

1,342,201. Patented June 1, 1920.

Inventor
Walter C. Beckwith
Percy H. Moore
Attorney

UNITED STATES PATENT OFFICE.

WALTER C. BECKWITH, OF FOSTORIA, OHIO.

EXPANSION-BOLT.

1,342,201.  Specification of Letters Patent.  Patented June 1, 1920.

Application filed May 25, 1918, Serial No. 236,550. Renewed October 27, 1919. Serial No. 333,688.

*To all whom it may concern:*

Be it known that I, WALTER C. BECKWITH, a citizen of the United States of America, residing at Fostoria, in the county of Seneca and State of Ohio, have invented certain new and useful Improvements in Expansion-Bolts, of which the following is a specification.

My invention relates to expansion bolts and has for its object to facilitate the fastening of a plate or other member to the exterior of a second member the opposite face of which is inaccessible.

Other objects of my invention will be in part described and in part apparent as the description is proceeded with.

Figure 1:
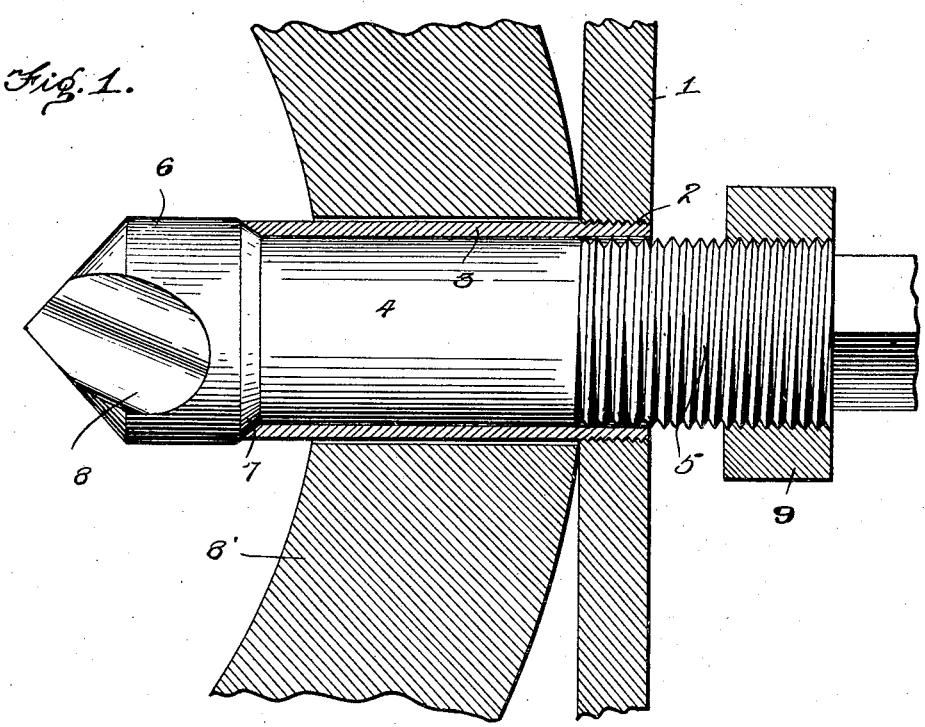
Figure 1 is a view partly in section of my invention before the sleeve has been expanded.

Referring more particularly to the drawings in which like reference numerals, refer to corresponding parts throughout the several views 1 denotes a templet plate formed with a plurality of preferably threaded openings 2 into which are threaded or otherwise secured tubular sleeves 3.

4 is a bolt member having a threaded shank 5 and an enlarged head 6 formed with cutting or boring grooves 8 capable of penetrating hard steel. The threaded shank 5 is of slightly less diameter than the bore of the sleeves 3 while the head 6 is of somewhat greater diameter than that of the sleeve. The head 6 of the bolt member is tapered or cone shaped, at its point of juncture with the shank as indicated at 7 for a purpose to be presently described.

In salvaging operations considerable difficulty has been experienced in attaching cables and the like to sunken submarines and other vessels due to the fact that oftentimes no part of the exterior of the vessel affords a secure fastening means and furthermore due to the difficulty of bolting or otherwise securing hooks or rings to a vessel sunk in deep water. This difficulty is overcome by my invention.

In practice the plates 1 are secured to the sides of the vessel 8 in the following manner.

Figures 2, 3:
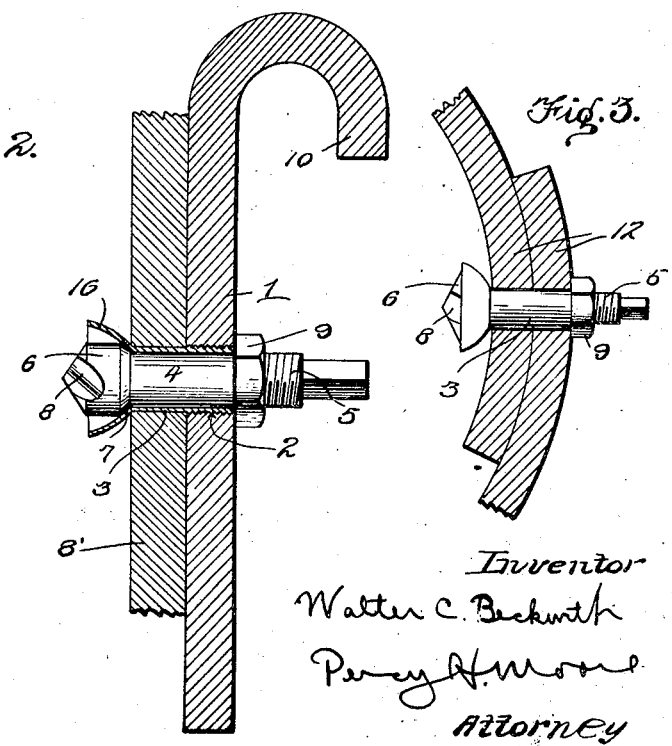
Fig. 2 is a view similar to Fig. 1 showing the sleeve expanded.
Fig. 3 is a fragmentary view of a tank showing my invention employed to bolt the meeting edges thereof together.

The shanks of the bolt members 4 are inserted through the sleeves 3 and the nuts 9 screwed partly home. The ends of the shanks are then connected to any suitable power device for rotating the bolt members, and the plate 1 is lowered in place together with the power device in any approved manner. Rotation of the bolt members when properly positioned cause the latter to bore through the sides of the vessel 15 whereupon further rotation of the nuts 9 draw the beveled portion 7 of the heads 6 of the bolt members into the sleeves 3 expanding or upsetting the latter as illustrated at 16 in Fig. 2. The bolt members thus become locked against withdrawal by virtue of the fact that it is impossible to withdraw the enlarged heads of the bolt members through the restricted bore of the sleeves 3. The plates 1 serve as templets or guides to aid in properly positioning the bolt members and are particularly advantageous in underwater operations. They may also carry rings or other projections 10 to which cables or the like may be readily attached but the shank ends of the bolt members preferably serve the latter purpose.

Where my invention is employed above water, as in bolting together the meeting edges of tanks or the like, as illustrated in Fig. 3, the templet plate 1 may be dispensed with and the operation will then be as follows:

The sleeves 3 are placed over the shanks 5 of the bolt members and the nuts 9 partially screwed thereon. The bolt members are then rotated in the manner previously described until the meeting edges of the tank 12 have been perforated. The nuts 9 are then tightened up until the beveled portion 7 of the bolt members cause them to expand in an obvious manner.

While I have described my invention as particularly adapted for attaching plates and the like to sunken vessels it will be understood that my invention is adapted for securing plates or other members to any hollow objects or to walls or other members where the interior surfaces thereof cannot be conveniently reached.

Having thus described my invention, what I claim is:

1. In a device of the character described the combination of a plate having an opening therein, a hollow sleeve secured in said opening and projecting therethrough, a bolt having a threaded shank of less diameter than said sleeve and a boring head of greater diameter than said sleeve and a nut for said threaded shank.

2. In a device of the character described the combination of a plate having an opening therein, a hollow member secured to said plate in register with said opening, a bolt member having a threaded shank adapted to freely enter said hollow member and said opening, said bolt member having a boring head of greater diameter than said hollow member, and a nut for said threaded shank.

3. In a device of the character described a bolt member comprising a threaded shank and an enlarged boring head, a sleeve on said shank of less diameter than said head, a nut on said shank and means on said head for expanding said sleeve when said nut is screwed home.

4. In a device of the character described, a bolt member having a threaded shank and an enlarged boring head, a nut on said shank, and means on said shank for preventing the withdrawal of said bolt member from an object into which it has penetrated when said nut is screwed home.

In testimony whereof I affix my signature in presence of a witness.

WALTER C. BECKWITH.

Witness:
 EDNA JAMES SHEEHY.